United States Patent
Kolluri Venkata Sesha et al.

(10) Patent No.: US 10,963,458 B2
(45) Date of Patent: Mar. 30, 2021

(54) FEDERATED CHATBOTS

(71) Applicant: International Business Machines Corporation, Armonk, NY (US)

(72) Inventors: Saiprasad Kolluri Venkata Sesha, Bangalore (IN); Seema Nagar, Bangalore (IN); Sougata Mukherjea, New Delhi (IN); Kuntal Dey, Vasant Kunj (IN)

(73) Assignee: International Business Machines Corporation, Armonk, NY (US)

( * ) Notice: Subject to any disclaimer, the term of this patent is extended or adjusted under 35 U.S.C. 154(b) by 238 days.

(21) Appl. No.: 16/119,275

(22) Filed: Aug. 31, 2018

(65) Prior Publication Data

US 2020/0073982 A1    Mar. 5, 2020

(51) Int. Cl.
    *G06F 17/30*    (2006.01)
    *G06F 16/242*   (2019.01)
    *G06F 16/248*   (2019.01)

(52) U.S. Cl.
    CPC .......... *G06F 16/243* (2019.01); *G06F 16/248* (2019.01)

(58) Field of Classification Search
    CPC ........ G06F 16/13; G06F 16/24; G06F 16/136; G06N 5/00; G06N 3/00; G06B 13/00
    See application file for complete search history.

(56) References Cited

U.S. PATENT DOCUMENTS

| | | | |
|---|---|---|---|
| 2012/0253788 A1* | 10/2012 | Heck | G06F 40/30 704/9 |
| 2018/0025085 A1 | 1/2018 | Sarangi et al. | |
| 2018/0052573 A1* | 2/2018 | Comertoglu | G06F 3/0484 |
| 2018/0102988 A1* | 4/2018 | Ray | H04L 43/06 |
| 2018/0337872 A1* | 11/2018 | Fawcett | G06F 16/3329 |
| 2019/0124020 A1* | 4/2019 | Bobbarjung | G06Q 20/123 |
| 2019/0189123 A1* | 6/2019 | Sugiyama | G10L 13/00 |

* cited by examiner

*Primary Examiner* — Hung D Le
(74) *Attorney, Agent, or Firm* — Patterson + Sheridan, LLP (57) ABSTRACT

Method and apparatus for improving ease of use, customizability, and functionality of computing devices via chatbots may be realized by processing a natural language query, by a first chatbot, to identify a monitored device in a computing environment that relates to the natural language query; transmitting the query to a second chatbot provided by the monitored device; receiving a response from the second chatbot identifying an anomaly observed on the monitored device; and outputting an user interface for display, the user interface comprising a natural language summary of the response.

20 Claims, 11 Drawing Sheets

FEDERATED CHATBOTS

BACKGROUND

The present invention relates to automated natural language agents (also referred to as "chatbots"), and more specifically, to specialized agents linked to specific systems in a computing environment. Chatbots may be used to process natural language queries addressed thereto to output natural language responses. A user may converse with the chatbot using the language patterns employed by humans, rather than submitting machine-formatted queries to a database. A user may converse with the chatbot via text or via spoken language that is parsed by the chatbot for intended meaning and for potential responses applicable to the determined meaning of the user's queries. Chatbots, to determine the intended meaning of a user's queries, are trained in specific fields of knowledge to provide relevant responses. When a user has broad questions, questions that have ambiguous meanings, or questions that may be answered differently by different chatbots, receiving a relevant or encompassing response may require the user to repeatedly resubmit narrowed questions to specific chatbots.

SUMMARY

According to one embodiment of the present invention, a method for using modular chatbots to improve the functionality of computing devices via increased reliability, reducing processing resources, and improved customizability is provided by processing a natural language query, by a first chatbot, to identify a monitored device in a computing environment that relates to the natural language query; transmitting the query to a second chatbot provided by the monitored device; receiving a response from the second chatbot identifying an anomaly observed on the monitored device; and outputting an user interface for display, the user interface comprising a natural language summary of the response.

According to another embodiment of the present invention, a system for using modular chatbots to improve the functionality of computing devices via increased reliability, reducing processing resources, and improved customizability is provided via a processor; and a memory device including instructions that when executed by the processor enable the processor to: identify a plurality of chatbots that correspond to an identified problem stated in a natural language query, wherein the plurality of chatbots are provided on a plurality of devices in a computing environment; transmitting a plurality of formatted queries to the plurality of chatbots, based on the natural language query; and in response to receiving anomaly determinations from the plurality of chatbots, output for display, in a user interface, a natural language summary of those anomaly determinations of the anomaly determinations that positively indicate an anomaly on a corresponding device.

According to a further embodiment of the present invention, a computer program product for using modular chatbots to improve the functionality of computing devices via increased reliability is provided on aa computer-readable storage medium having computer-readable program code embodied therewith, the computer-readable program code executable by one or more computer processors to: receive, at a first chatbot running on an administrative device, a query in natural language related to a computing environment; identify a monitored device in the computing environment from the query; transmit the query to a second chatbot provided by the monitored device; receive a response from the second chatbot including a natural language anomaly observation related to an anomaly observed on the monitored device; and output for display in an user interface a natural language summary of the response including an identity of the second chatbot.

DETAILED DESCRIPTION

In a computing environment, an administrative user or Information and Technology (IT) department may be tasked with maintaining several computing devices, supporting hardware device (routers, power supplies, etc.), and/or software applications running in the environment. An administrative user may be provided a dashboard of various environmental metrics and may query specific systems for information to identify issues affecting the computing environment.

A federated chatbot system, as described herein, improves the functionality of computing devices by (at least) providing administrative users with a centralized point of communication for assessing the status of a computing environment via natural language input. A master chatbot receives queries from the user, parses the query, and distributes the queries to selected micro chatbots associated with specific systems in the computing environment. The micro chatbots are selectively activated by the master chatbot based on the user query (thus reducing the use of computing resources across the environment), and the activated micro chatbots return responses to the master chatbot. The master chatbot, in turn, determines which responses from the micro chatbots are responsive to the user query, and presents the determined responses to the user and enables the user to directly communicate with the responsive micro chatbots (thus improving a user experience).

Figure 1:
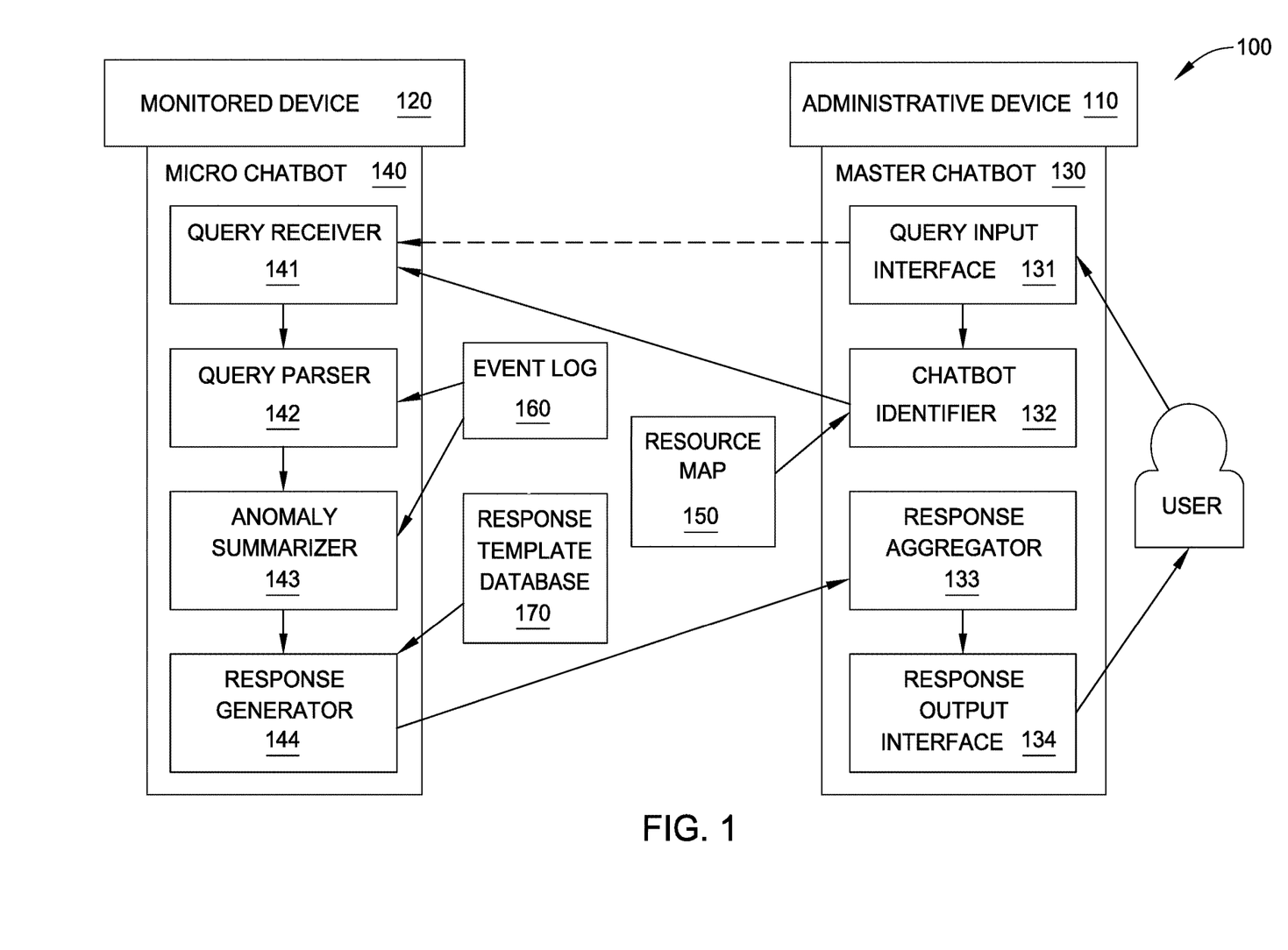
FIG. 1 illustrates a system architecture for deploying a federated chatbot system to a computing environment, according to aspects of the present disclosure.

FIG. 1 illustrates a system architecture 100 for deploying a federated chatbot system to a computing environment. For purposes of clarity, one administrative device 110 that provides a master chatbot 130 and one monitored device 120 that provides a micro chatbot 140 are illustrated in FIG. 1, but a computing environment may include a plurality of administrative devices 110 that each provide an instance of a master chatbot 130 and a plurality of monitored devices 120 that each provide a corresponding micro chatbot 140. Additionally, a given monitored device 120 may provide one or more micro chatbots 140 that are tailored to specific aspects of the monitored device 120 (e.g., a first micro chatbot 140 and a second micro chatbot 140 may be provided by respective virtual machines running on a single monitored device 120).

Each of the administrative devices 110 and the monitored devices 120 may be one of a variety of computing devices, including, but not limited to: personal computers (desktop devices, laptop devices, tablets, smartphones, etc.), server computers (including virtual machines running thereon), networking devices (routers, access points, modems, bridges, etc.), supporting devices (uninterruptable power supplies, printers, faxes, copiers, networked telephones, shared computer storage devices, etc.). These computing devices may include one or more processors and memory devices that include instructions that the processors execute to perform the functionalities described in the present disclosure. Example hardware for a computing device is discussed in greater detail in relation to FIG. 5.

The master chatbot 130 provided by the administrative devices 110 includes a query input interface 131, a chatbot identifier 132, a response aggregator 133, and a response output interface 134. In various embodiments, the administrative device 110 includes or is in communication with an external device that includes a resource map 150 that the master chatbot 130 may reference when identifying micro chatbots 140 related to a user query. The master chatbot 130 provides a centralized point of access for a user to access and digest responses from micro chatbots 140, which operate independently from each other and the master chatbot 130 on the respective monitored devices 120.

In various embodiments, the query input interface 131 may include a text input box in a user interface (UI) and/or a voice-to-text system for receiving utterances from a user, and converting the utterances into text for display and entry in a text input box. The UI may be displayed on a display device of the administrative device 110 and receive edits to an input query prior to confirmation from the user.

The chatbot identifier 132 works in association with the resource map 150 to identify the micro chatbots 140 that are capable of answering the questions posed in the query received from the user. The chatbot identifier 132 parses the query to identify the monitored devices 120 referenced directly as well as the monitored devices 120 that are referenced by inference in the natural language of the query. For example, a user may ask, "what is the status of server 2?", and the chatbot identifier 132 parses the query to identify that the user is seeking information related to "status" and a device directly referenced as "server 2". In another example, a user may ask "why is the network so slow?", and the chatbot identifier 132 parses the query to identify that the user is seeking information on network speed, and infers that devices related to network performance (e.g., switches, routers, access points, modems) may be related to the query.

Based on the information type requested by the user, and the devices identified as related to that information, the chatbot identifier 132 may query the resource map 150 to identify micro chatbots 140 available to provide responses to the user's query. In embodiments where the user directly queries an activated micro chatbot 140, the chatbot identifier 132 may forward formatted queries directly to an addressed micro chatbot 140 without performing a re-lookup in the resource map 150. For example, a user may initially address a query to "servers", and the chatbot identifier 132 identifies the micro chatbots 140 corresponding to monitored devices 120 of a server device class from the resource map 150, and when the user directs a subsequent query to "server 2", the chatbot identifier 132 may identify server 2 in the subsequent query and forward the query to server 2 without accessing the resource map 150, as the micro chatbot 140 on server 2 has already been identified.

In various embodiments, the chatbot identifier 132 reformats the query received from the user based on the class of device, the class of chatbot, and/or the grammar of the natural language query to improve the efficiency and consistency at which the micro chatbots 140 can respond to the query. By centralizing the Natural Language Processing (NLP) with the master chatbot 130, the micro chatbots 140 do not need to perform NLP (thus saving computing resources), and the potential of several chatbots responding to several potentially valid interpretations of one natural language query is avoided (thus improving consistency). For example, a user may issue the natural language query of: "Which servers are under heavy use?", which could be interpreted under NLP to refer to a request of identities of servers that: have high processor use rates, high hard drive use rates, a high number of users logged in for a given time period, etc., and what constitutes "high" may also be ambiguously interpreted by different chatbots. The master chatbot 130, therefore, parses the user's query to provide each micro chatbot 140 (of a given class of chatbots) the same reformatted version of the user's query.

The master chatbot 130 may format the natural language query that is transmitted to each micro chatbot 140 based on the class of the micro chatbot 140. For example, a query for "why is the network slow?" may be formatted to request different metrics from micro chatbots 140 associated with different classes of monitored devices 120 (e.g., CPU usage metrics from servers, signal to noise ratios in wireless access points).

The response aggregator 133 receives responses from one or more micro chatbots 140 and aggregates and classifies the responses. In various embodiments, if a given micro chatbot 140 does not provide a response within a predefined amount of time from when the query was transmitted, the response aggregator 133 determines that the given micro chatbot 140 (or corresponding monitored device 120) has timed out, and treats the timeout as a response. The response aggregator 133 may determine a number of micro chatbots 140 that report anomalous results, an average or baseline for a metric reported by the micro chatbots 140, count or measure a number of types of anomalies, and rank the responses based on a severity and/or type of the anomaly.

The response output interface 134, based on the results of the response aggregator 133 and the responses received from the micro chatbots 140, formats the responses into a summary for display to the user. The response output interface 134 may include specific responses from micro chatbots 140 that indicate anomalous results in response to the query in the summary, and those particular micro chatbots 140 may be made part of a conversation with the user. In contrast, the response output interface 134 may exclude specific responses from micro chatbots 140 that indicate non-anomalous results in response to the query in the summary, and those particular micro chatbots 140 may be deactivated (or not communicated with again) in a particular conversation with the user. Thus the response output interface 134 provides the user with an easily digestible summary of the status of the computing environment, and allows the master chatbot 130 to provide a single interface that may be dynamically scaled up and down to direct the user to interact with relevant chatbots for a particular query or string of queries and responses.

Each micro chatbot 140 provided by a monitored device 120 includes a query receiver 141, a query parser 142, an anomaly summarizer 143, and a response generator 144. In various embodiments, the monitored device 120 includes or is in communication with an external device that includes an event log 160 and/or a response template database 170. The micro chatbots 140 are trained to observe performance metrics and identify anomalies occurring on an associated monitored device 120.

The query receiver 141 receives queries from the user via the master chatbot 130. The master chatbot 130 transmits the query to the micro chatbots 140 indicated in the query (and not to those micro chatbots 140 that are not indicated in the query).

Each micro chatbot 140 is pre-trained for understanding the domain of the monitored device 120 corresponding to the micro chatbot 140 and uses specific analytical processes tailored to the specific parameters, attributes, and characteristics related to the system(s) of the monitored device 120. The query parser 142 parses the query transmitted from the master chatbot 130, and determines what parameters, attributes, and characteristics are to be retrieved in response to the query. In various embodiments, a micro chatbot 140 may be provided on a each monitored device 120 of a class of monitored devices or one monitored device 120 of a class of monitored devices, and each monitored device 120 may pool event and/or anomaly logs in an event log 160. Depending on the information requested in the query, the micro chatbot 140 returns different information or aggregations of information from the event log 160.

The anomaly summarizer 143 determines whether the retrieved parameters indicate an anomalous event or condition has occurred on the corresponding monitored device 120. In various aspects, various thresholds for anomalous conditions are stored, which the anomaly summarizer 143 compares against the events retrieved in response to the query.

The response generator 144 generates a natural language response that summarizes/indicates anomaly or non-anomaly (depending upon whether any anomaly exists) of the corresponding monitored device 120 related to the query. In some embodiments, the response generator 144 further includes qualitative (e.g., anomaly/no anomaly) flags, and quantitative measures (e.g., 92% full, 5 MB available, 99.99% uptime, core temperature 85° C.) of the various metrics included in the response. In some embodiments, a format of the response is set according to a template stored in the response template database 170, in which the response generator 144 replaces or updates placeholder values in the template with the values determined by the anomaly summarizer 143.

Each of the micro chatbots 140 transmits the response generated by the response generator 144 to the response aggregator 133 of the master chatbot 130, which may perform additional outlier analysis on the aggregated responses from the micro chatbots 140. The master chatbot 130 may use a combination of NLP-based and domain-specific summarization techniques to collate and summarize the responses from micro chatbots 140, and perform second-level analytics on the responses such as group-by operations ("three malfunctioning systems are database hosts"), as well as aggregation operations (e.g., "the average CPU load of these three systems are 94%", "the minimum RAM utilization in these three machines is 99%").

Figure 2:
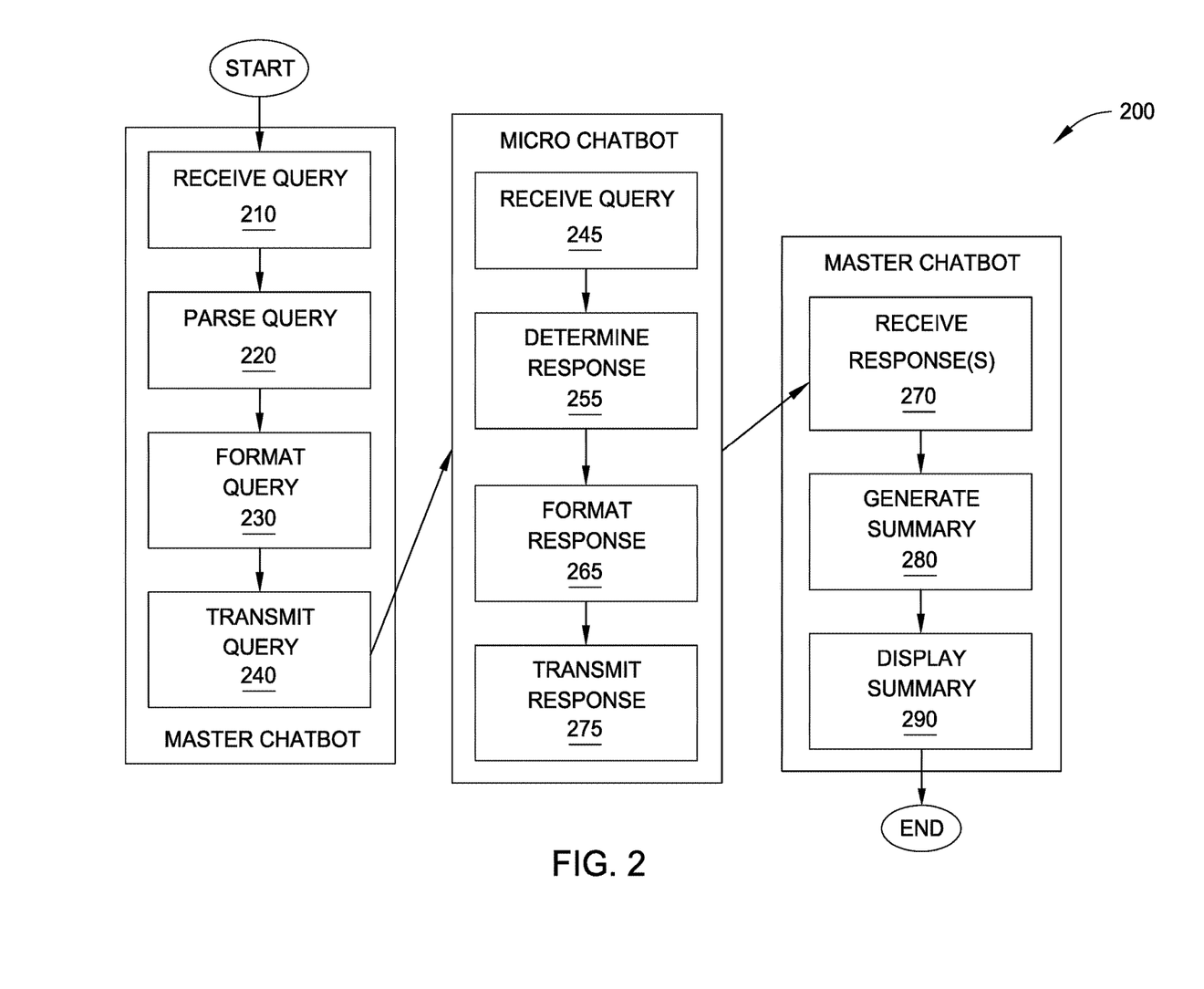
FIG. 2 is a flowchart for an example method for processing queries in a federated chatbot system, according to aspects of the present disclosure.

FIG. 2 is a flowchart for a method 200 for processing queries in a federated chatbot system. Method 200 begins with block 210, where the master chatbot 130 receives a query from a user. The query is a natural language query, which the query input interface 131 may receive as text or via voice and converts to text.

At block 220, the master chatbot 130 parses the query to identify information requested in the query and the monitored devices 120 (and corresponding micro chatbots 140) in the computing environment that may provide the requested information. The master chatbot 130 performs NLP on the query to identify explicitly and implicitly referenced information requested and devices from which the information is requested.

At block 230, the master chatbot 130 formats query for the destination micro chatbot 140. In various embodiments, the master chatbot 130 formats the query for each class of micro chatbot 140 that will receive the query to provide a consistent interpretation of the original natural language query (received per block 210) at each of the micro chatbots 140. For example, a first micro chatbot 140 and a second micro chatbot 140 that are both associated with a server-type monitored device 120 may receive a first formatted query and a third micro chatbot 140 and a fourth micro chatbot 140 that are both associated with a switch-type monitored device 120 may receive a second formatted query. The formatted query may omit requests from information that an associated chatbot does not maintain or have access to, and may provide the query in a structured format (i.e., not in a natural language format) for an unambiguous interpretation at each micro chatbot 140.

At block 240, the master chatbot 130 transmits the query to a micro chatbot 140 provided by the monitored device 120. In various embodiments, the time at which the queries are transmitted is tracked, so that if a particular micro chatbot 140 does not respond within a given time window, the master chatbot 130 may determine that the particular micro chatbot 140 has timed out or is otherwise non-responsive. The timeout may be treated as a response or evidence of an anomaly at the corresponding monitored device 120.

At block 245, the micro chatbot 140 receives the query from the master chatbot 130. Each of the micro chatbots 140 in a computing environment may receive the query at different times due to network delays, different times of transmittal, processing delays at network interface elements of the corresponding monitored devices 120, etc. In some embodiments, the micro chatbot 140 is not activated as a process, or is run as a background process with reduced processing resource consumption, until a query is received from the master chatbot 130, at which time the micro chatbot 140 activates on the monitored device 120; thus conserving computing resources until the micro chatbot 140 is requested.

At block 255, the micro chatbot 140 parses the query received per block 245 and identifies data responsive to the query. In various embodiments, the micro chatbot 140 queries an event log 160 to identify data responsive to the query. In other embodiments, various registers on the monitored device 120 are queried for the data responsive to the query. The data responsive to the query may include numerical data (e.g., current CPU load), textual data (e.g., last user to attempt login), running averages of numerical data (e.g., average CPU load over last X minutes), time series of numerical data (e.g., bandwidth use from time X to time Y), time series of textual data (e.g., usernames of logins from time X to time Y), time data (e.g., last update), binary flags (e.g., TRUE/FALSE that a condition exists), and combinations thereof.

At block 265, the micro chatbot 140 formats a natural language response that includes the data responsive to the query (determined per block 255). In various embodiments, the response is formatted according to one or more templates retrieved from a response template database 170. In some embodiments, in addition to the natural langue formatting of the data in the response, the response may include a structured section that includes the responsive data and other information in a machine readable format for processing by the master chatbot 130, so that the master chatbot 130 does not need to perform NLP on the response from the micro chatbot(s) 140 when aggregating and summarizing the responses (per block 280).

At block 275, the micro chatbot 140 transmits the response to the master chatbot 130. In some embodiments, the micro chatbot 140 may remain an active process on the corresponding monitored device 120 for a preset amount of time after transmitting the response, in anticipation of receiving a subsequent query from the master chatbot 130, at which time the monitored device 120 may switch to running the micro chatbot 140 as a background process (or deactivate the micro chatbot 140) to provider fewer and/or lower priority clock cycles to processing tasks associated with the micro chatbot 140 until another query is received (per block 255). In other embodiments, in response to an anomaly determination included in the response, the micro chatbot 140 may remain active if an anomaly were detected or switch to running as a background process (or deactivate) if an anomaly were not detected to thereby conserve computing resources on the monitored device 120 when a subsequent query is not expected.

At block 270, the master chatbot 130 receives a response from a micro chatbot 140 to which the query was transmitted (per block 240). In various embodiments, the master chatbot 130 may continue to collect responses related to a given query over a period of time. For example, two responses to a single query may be received at different times by the master chatbot 130 due to one or more of: different processing speeds of associated micro chatbots 140, different network topologies, message queueing, etc. Once the time period has expired, or the master chatbot 130 has received responses from all of the micro chatbots 140 to which the query was transmitted, method 200 may proceed to block 280. If the time period expires, and a response is not received from a micro chatbot 140 to which the query was transmitted, the master chatbot 130 may determine that the particular micro chatbot 140 is non-responsive, and proceed to block 280 with a null response from that particular micro chatbot 140.

At block 280, the master chatbot 130 aggregates the responses received from the micro chatbots 140 and generates a natural language summary for presentation to a user. The responses from the micro chatbots 140 include natural language responses that the master chatbot 130 may incorporate into the summary or omit from the summary based on whether the response indicates an anomaly was detected by the micro chatbot 140, a number of anomalies detected, a number of types of anomalies detected, and system settings/user preferences. The master chatbot 130 may perform second level analysis on the collected responses to identify trends, averages, ranges, etc. of the reported metrics across the computing environment, and to organize the responses based on device class, anomaly class, severity levels, etc.

At block 290, the master chatbot 130 displays, in a user interface on the administrative device 110, the summary. The summary includes a portion associated with an identifier for the master chatbot 130 and the summarization of the responses from the micro chatbots 140. If any anomalies related to the query were detected, the summary may also include one or more of the natural language responses received from a micro chatbot 140 associated with the anomaly and an identifier for that micro chatbot 140. The user may use the identifiers for various chatbots to direct a subsequent query to a specific chatbot to receive additional data from that chatbot. Method 200 may then conclude or repeat in response to receiving a subsequent query from the user.

Figure 3A:
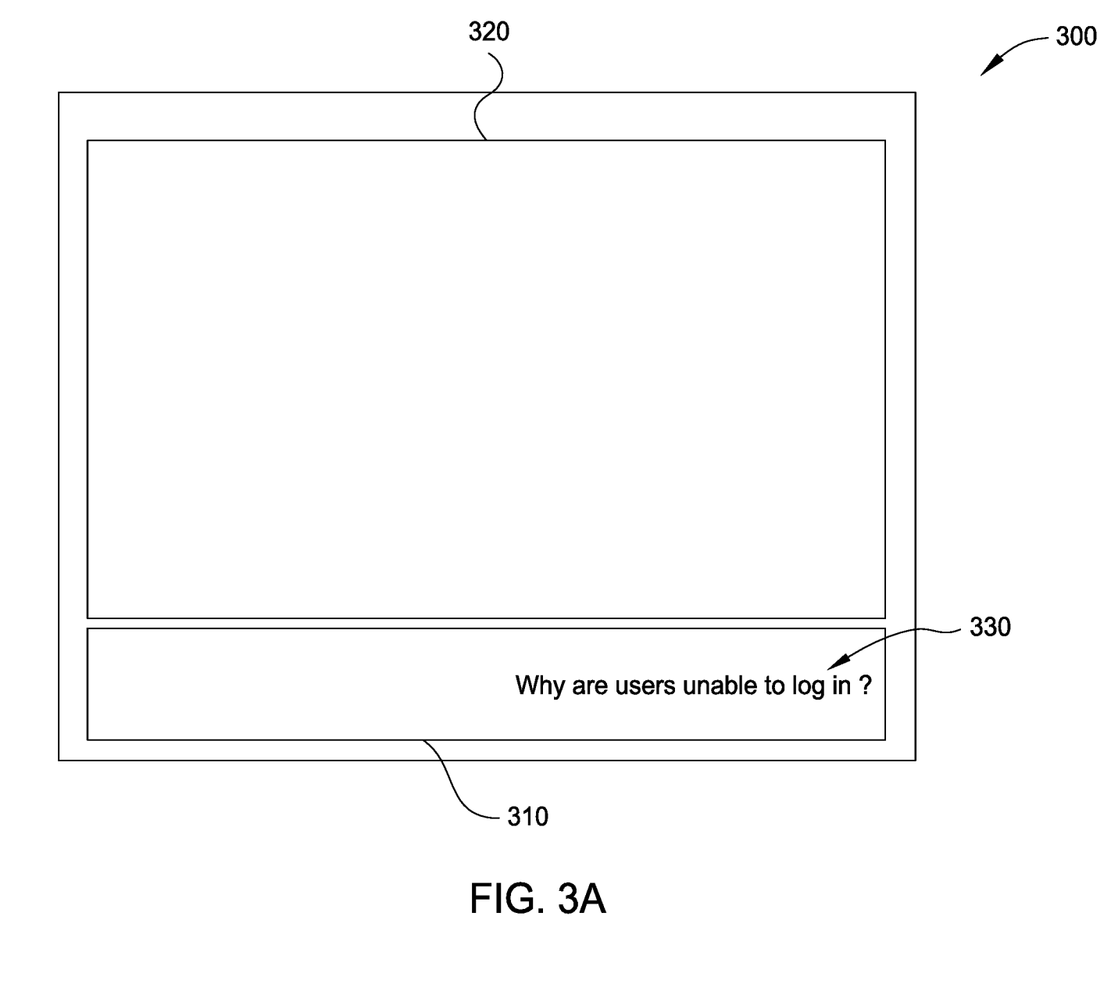
FIGS. 3A-D illustrate user interfaces for a series of queries issued by a user and handled by a federated chatbot system, according to aspects of the present disclosure.

FIGS. 3A-D illustrate user interfaces (UI 300) for a series of queries issued by a user and handled by a federated chatbot system. In FIG. 3A, the user issues a first query 330 to the master chatbot 130 in an input control 310 of "Why are the users unable to log in?". As no response has yet issued, the chat display 320 in the UI 300 is empty in FIG. 3A.

Figure 3B:
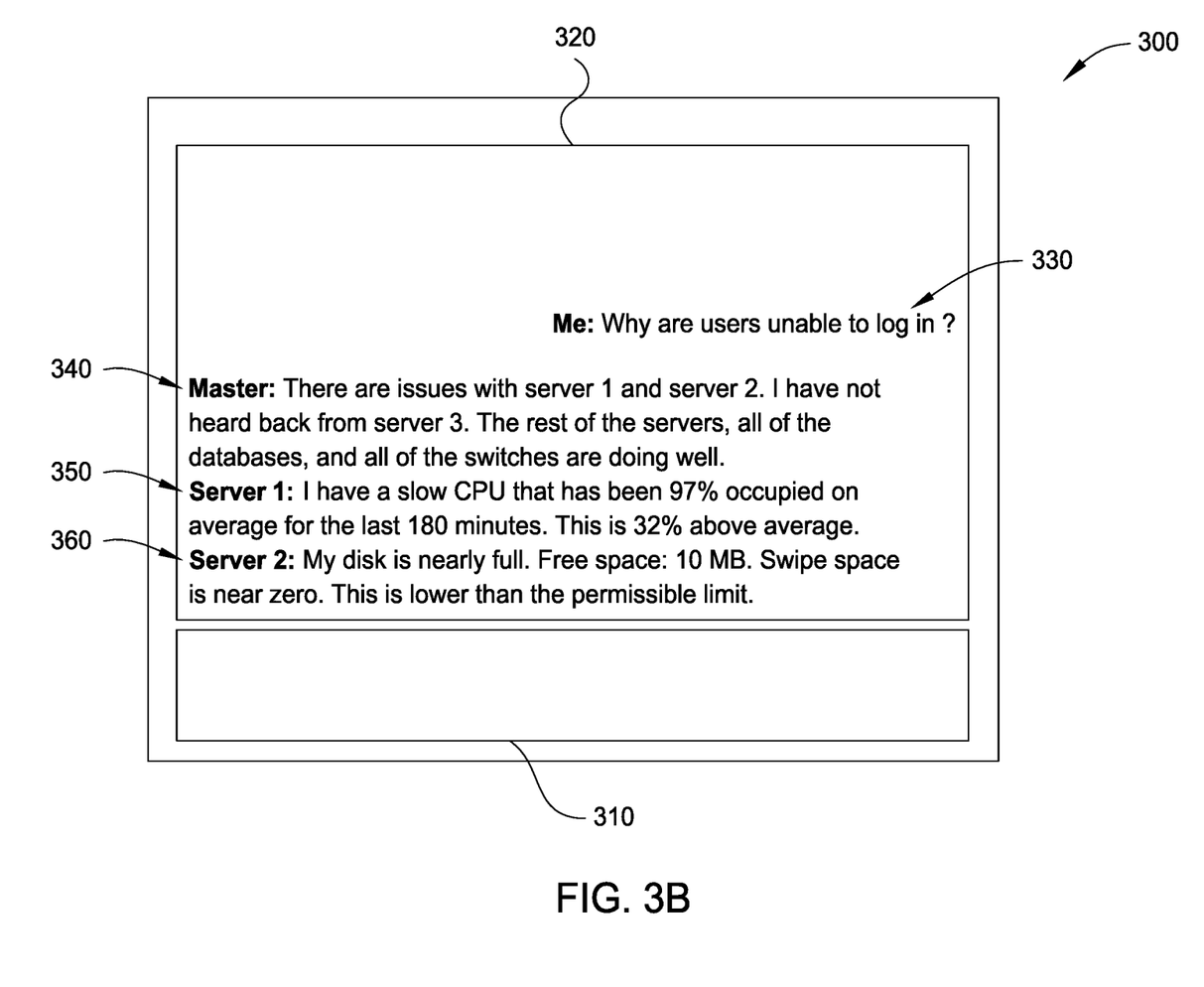

FIG. 3B illustrates the federated chatbot system's response to the first query 330. The first query 330 is illustrated in the chat display 320 along with a first summary response 340, a first specific response 350, and a second specific response 360. The master chatbot 130, received and parsed the first query 330, transmitted formatted versions of the query to various monitored devices 120, received responses, and identified anomaly determinations from each micro chatbot 140 that responded, and generated a natural language summary of those anomaly determinations as shown in the first summary response 340. The natural language summary includes the identifier of the master chatbot 130 (illustrated as "Master" in FIGS. 3B-D) and summaries of which monitored devices 120 have provided anomalous or non-anomalous reports in response to the query from the user.

The master chatbot 130 also determines, from the received anomaly determinations, which responses from specific micro chatbots 140 to include in the chat display 320. As illustrated, the first specific response 350 is the response to the first query 330 from a micro chatbot 140 corresponding to a monitored device 120 dubbed Server 1, and the second specific response 360 is the response to the first query 330 from a micro chatbot 140 corresponding to a monitored device 120 dubbed Server 2. In various embodiments, the master chatbot 130 may include more or fewer than two specific responses in the summary generated for the user's query.

In some embodiments, if a given micro chatbot 140 does not respond to a forwarded query from the master chatbot 130 within a predetermined amount of time, the master chatbot 130 may indicate a potential loss of communications with the corresponding monitored device 120 to the user in the summary response. In FIG. 3B, the master chatbot 130 has indicated in the first summary response 340 that a micro chatbot 140 corresponding to a monitored device 120 dubbed Server 3 has not responded to the forwarded query.

Figure 3C:
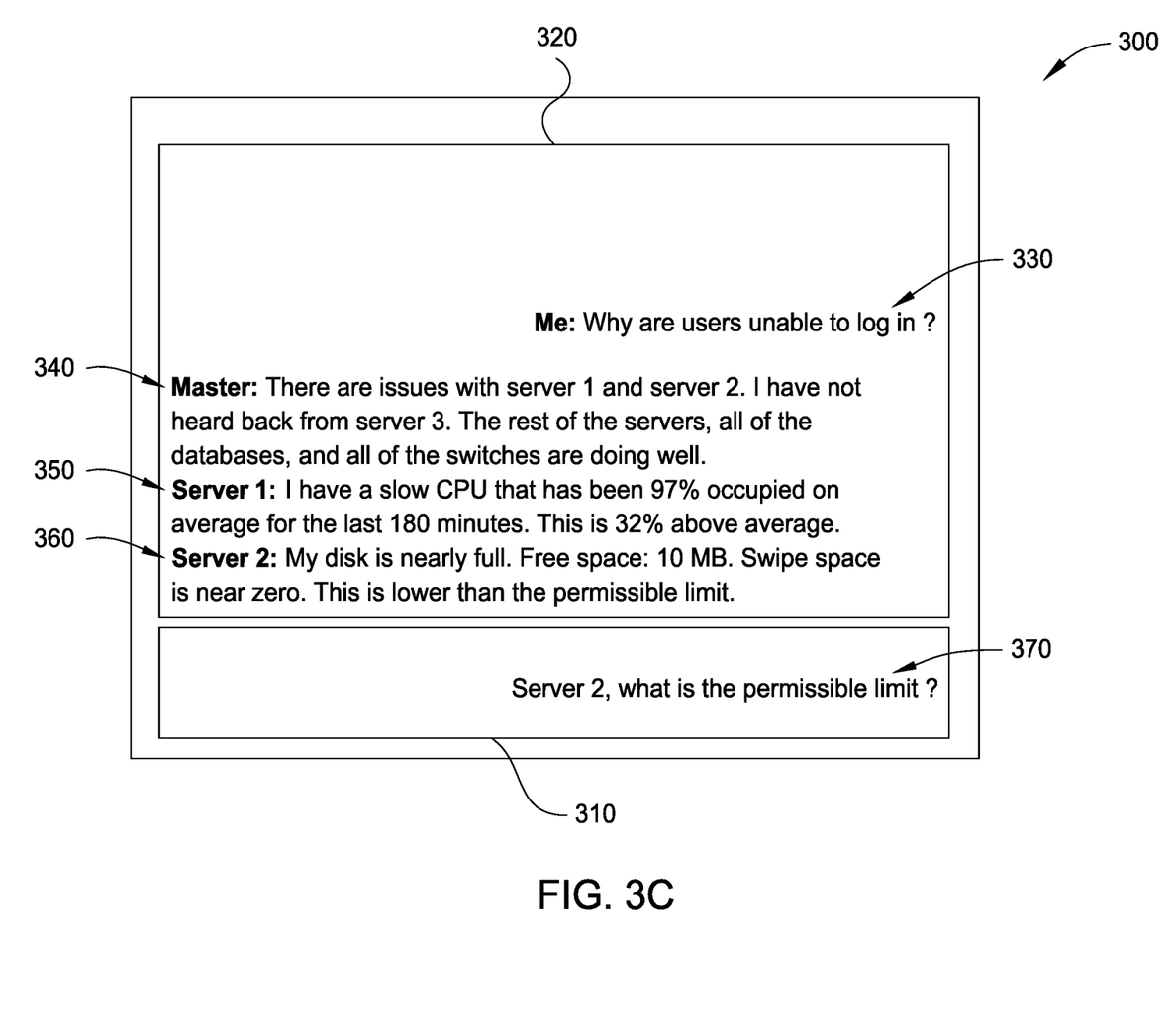

FIG. 3C illustrates the entry of a second query 370 by the user as a subsequent query of "Server 2, what is the permissible limit?" entered into the input control 310. Each of the specific responses in the summary include identifiers for the micro chatbots 140 that provided the specific responses so that the user (illustrated as "Server 1" and "Server 2" in FIGS. 3B-D). The user may address a given micro chatbot 140 to handle a subsequent query by including the identifier for that micro chatbot 140 in the subsequent query. In the illustrated example, the user has addressed "Server 2" in the second query 370. The master chatbot 130, parses the second query 370, formats the natural language therein for consumption by the micro chatbot 140 addressed therein, and forwards the formatted query to the addressed micro chatbot 140 (and not to the other micro chatbots 140 activated in response to the first query 330). A user may address one or more micro chatbots 140 or the master chatbot 130 in a subsequent query, and may indicate that one or more particular chatbots are to be addressed in the subsequent query by inclusion of the identifier in the subsequent query, selection of the identifier from the chat display 320 (e.g., via mouse click, touch input), and/or inference based on the other contents of the subsequent query.

Figure 3D:
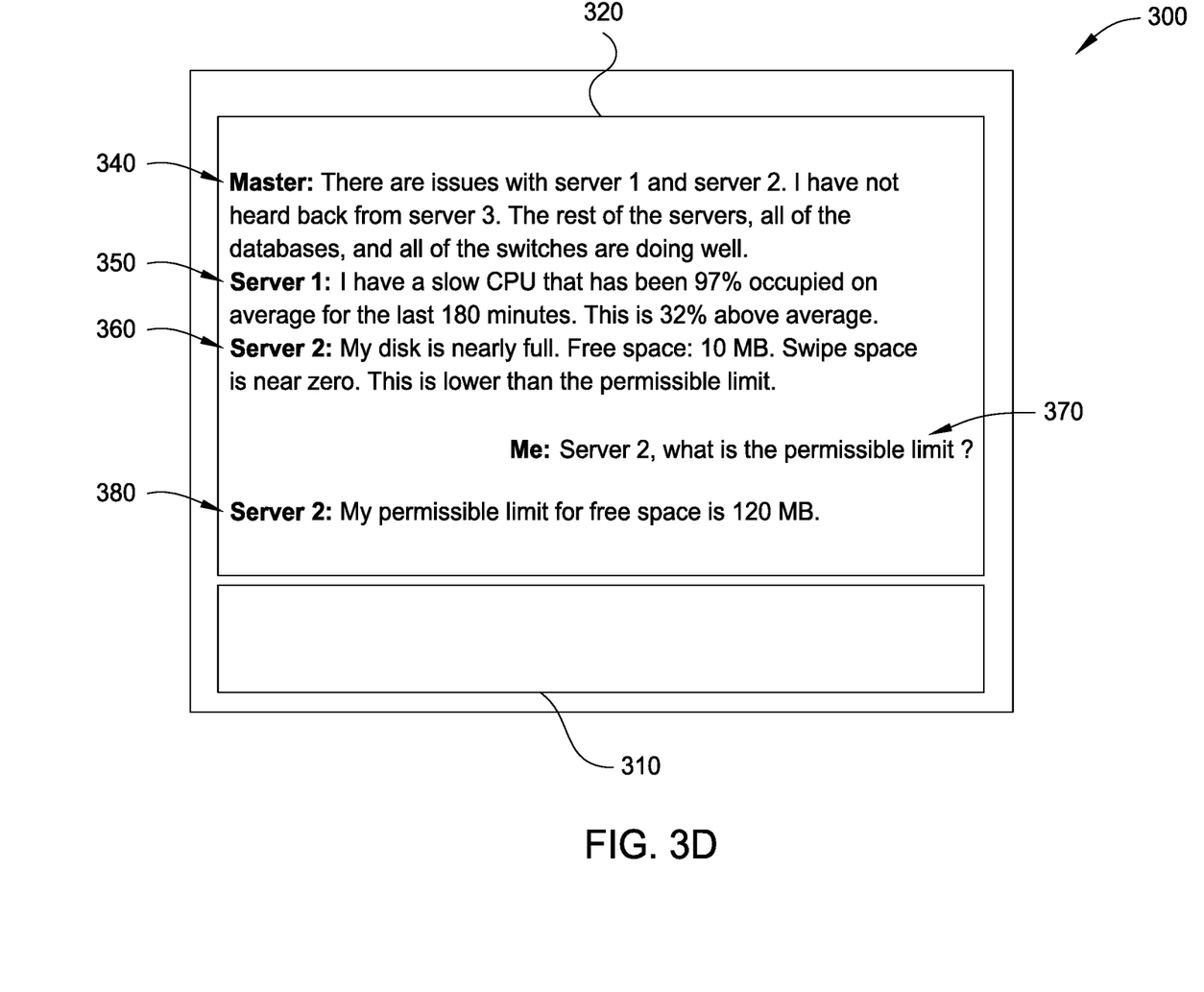

FIG. 3D illustrates a third specific response 380 provided from the micro chatbot 140 corresponding to the monitored device 120 dubbed "Server 2." The master chatbot 130 receives the response from the addressed micro chatbot 140, and displays the natural language response to the user in the chat display 320. The user may thus seamlessly interact with several chatbots, in aggregate or individually, via a single interface.

Figure 4A:
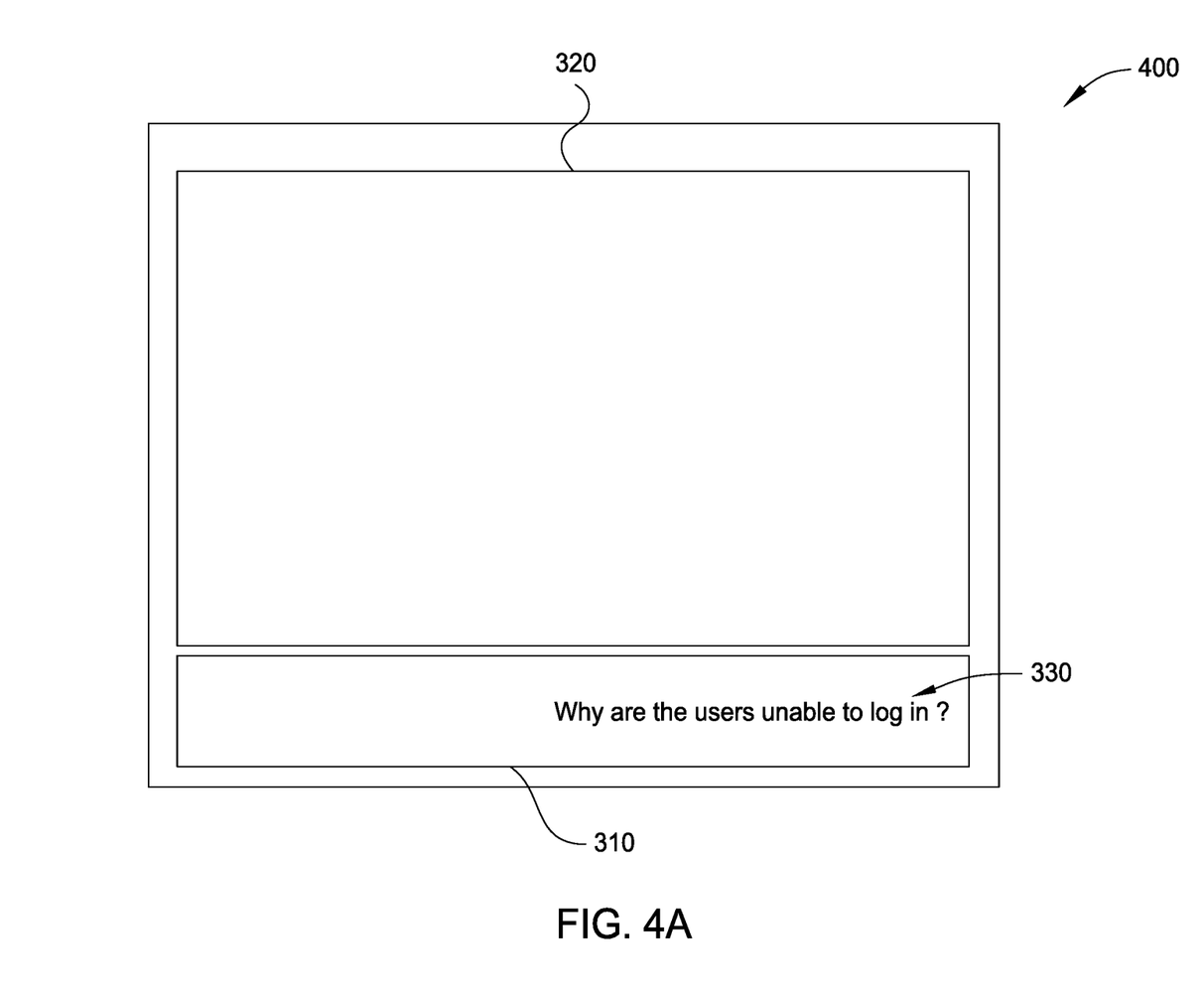
FIGS. 4A-D illustrate user interfaces for series of queries issued by a user and handled by a federated chatbot system, according to aspects of the present disclosure.

FIGS. 4A-D illustrate example UI 400 for a series of queries issued by a user and handled by a federated chatbot system. In FIG. 4A, the user issues a first query 330 to the master chatbot 130 in an input control 310 of "Why are the users unable to log in?". As no response has yet issued, the chat display 320 in the UI 400 is empty in FIG. 4A.

Figure 4B:
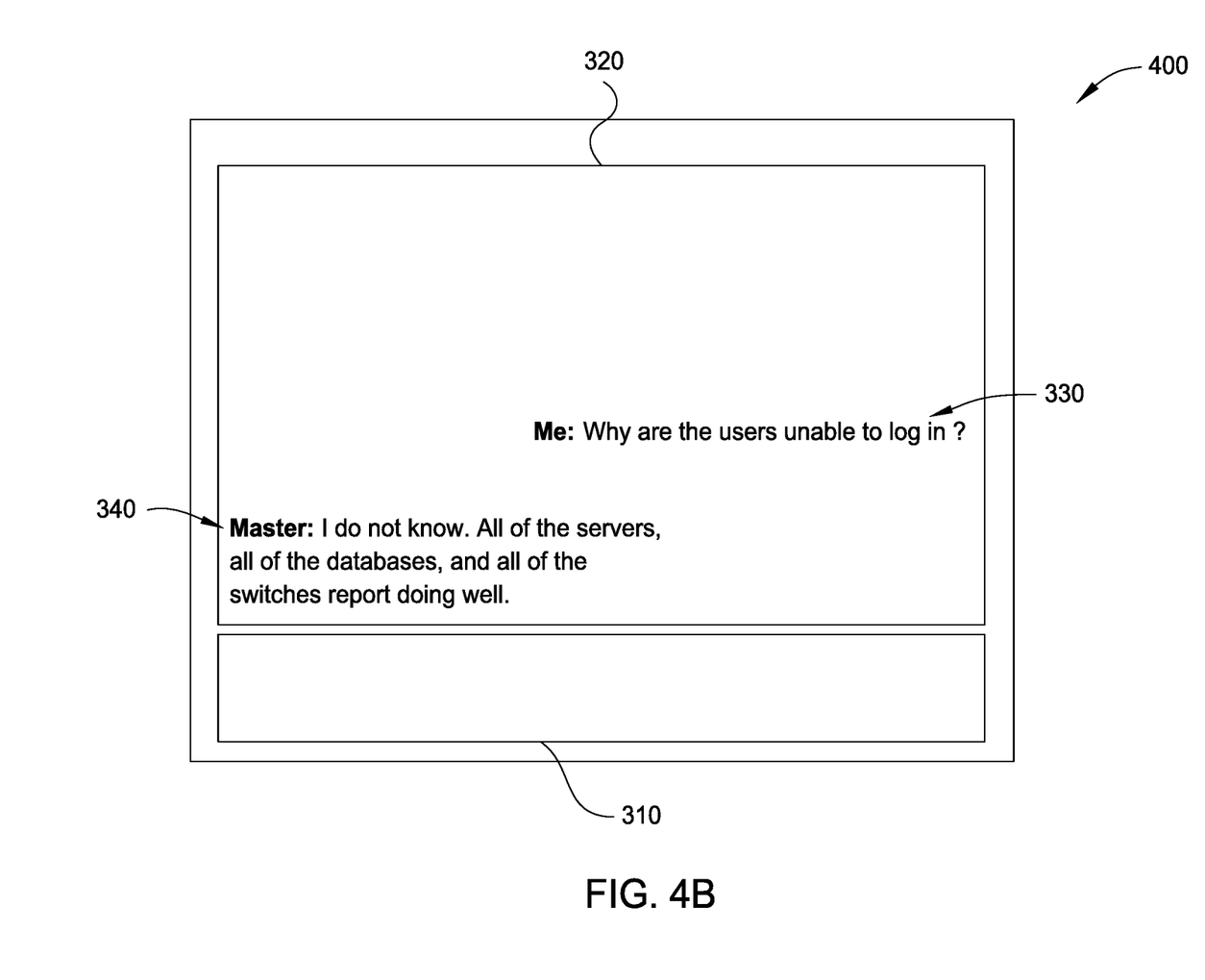

FIG. 4B illustrates the federated chatbot system's response to the first query 330. In FIG. 4B, in contrast to the example illustrated in FIG. 3B, the micro chatbots 140 have responded to the master chatbot 130, but no anomalies have been identified. The first summary response 340 displayed in the chat display 320 therefore indicates to the user that no anomalies were detected in response to the first query 330. In various embodiments, when no anomalies are detected, the master chatbot 130 may include an apology, a suggestion for a subsequent query, a request for clarification or the like in addition to the summary of the responses received from the micro chatbots 140.

Figure 4C:
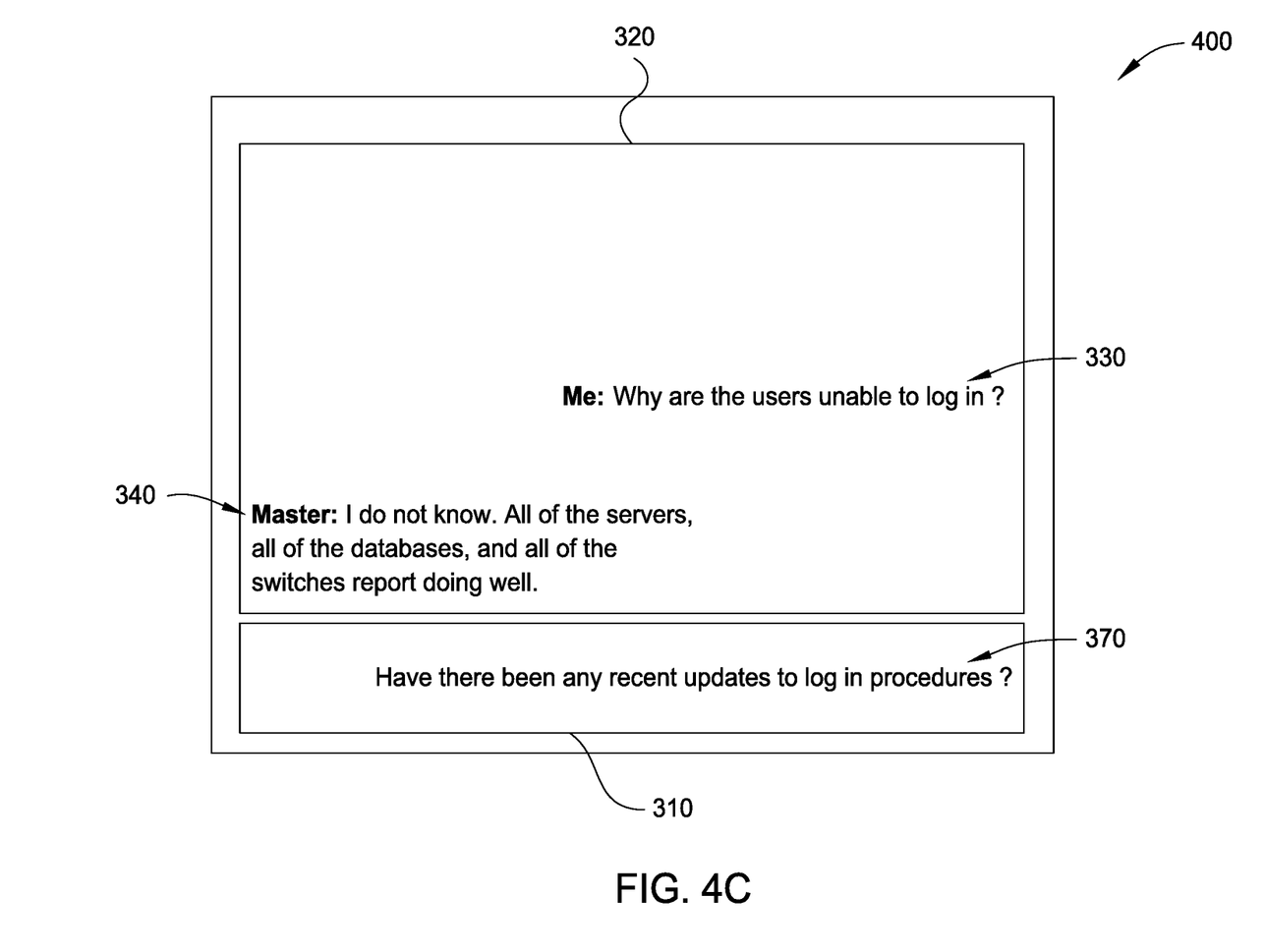
Figure 4D:
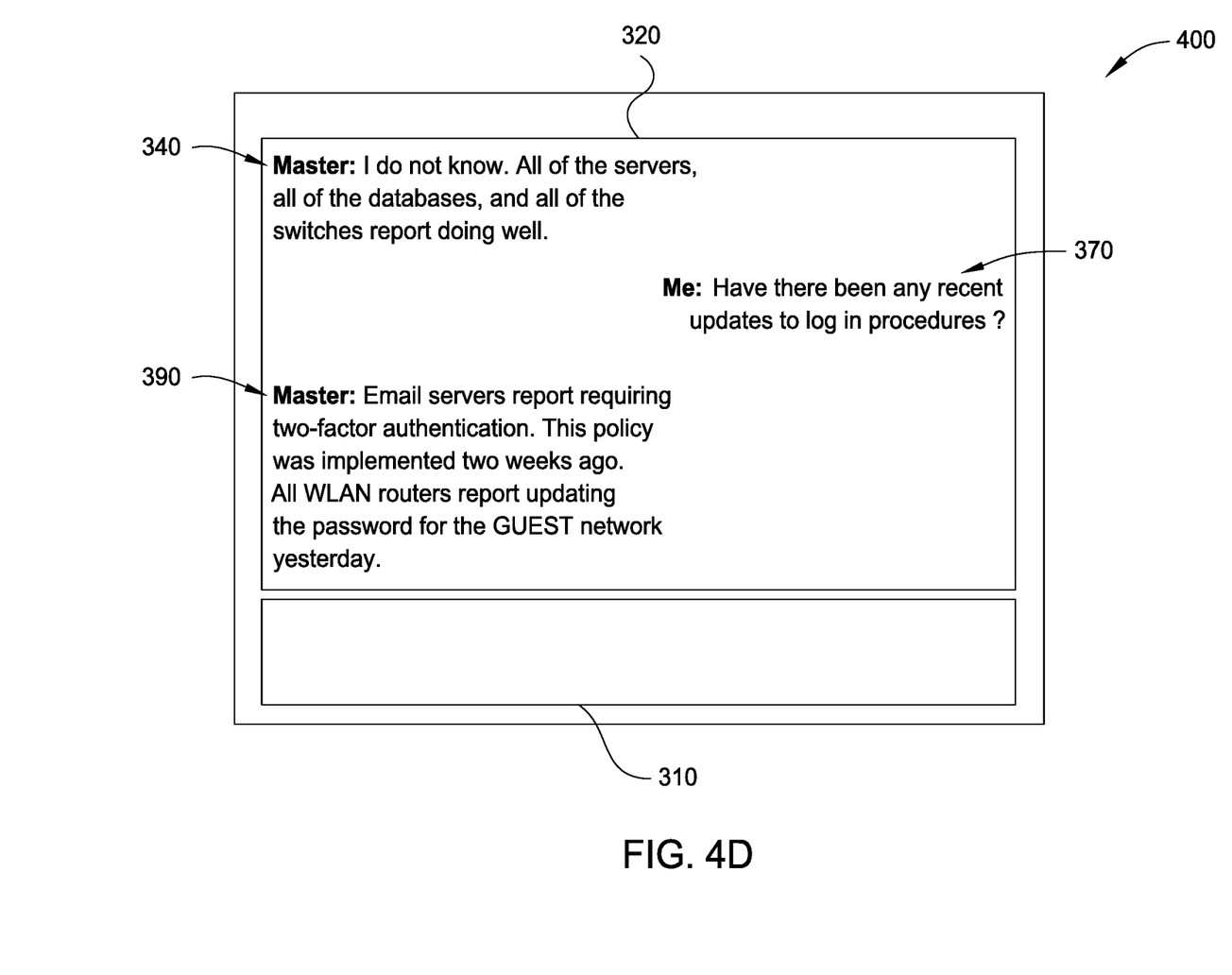

In FIG. 4C, the user issues a second query 370 to the master chatbot 130 in an input control 310 of "Have there been any recent updates to log in procedures?". The prior queries and responses are displayed in the chat display 320 to maintain a history of the user's interactions with the master chatbot 130 for a given session. As no specific device is referenced in the second query 370 in FIG. 4C, in contrast to the second query in FIG. 3C, the master chatbot 130 interprets the second query 370 to be a general query, that may be formatted and transmitted to one or more micro chatbots 140 in the computing environment based on the natural language contents of the second query 370. In the current example, the master chatbot 130 may format and transmit queries related to log in procedure changes to any monitored device 120 associated in the resource map 150 with using a login.

FIG. 4A illustrates a second summary response 390 related to the second query 370 input in FIG. 4B. In the illustrated example, several micro chatbots 140 responded in the affirmative to the second query 370, and due to system settings and the number of responses satisfying a maximum specific response threshold, the master chatbot 130 has summarized the resulting responses for the user in the second summary response 390 displayed in the chat display 320 without displaying specific responses from a particular micro chatbot 140. Depending on the number of anomalies, and the nature of the anomalies reported by the micro chatbots 140 to the master chatbot 130, the master chatbot 130 adjusts the content and natural language presentation of anomalies in the summary accordingly.

Figure 5:
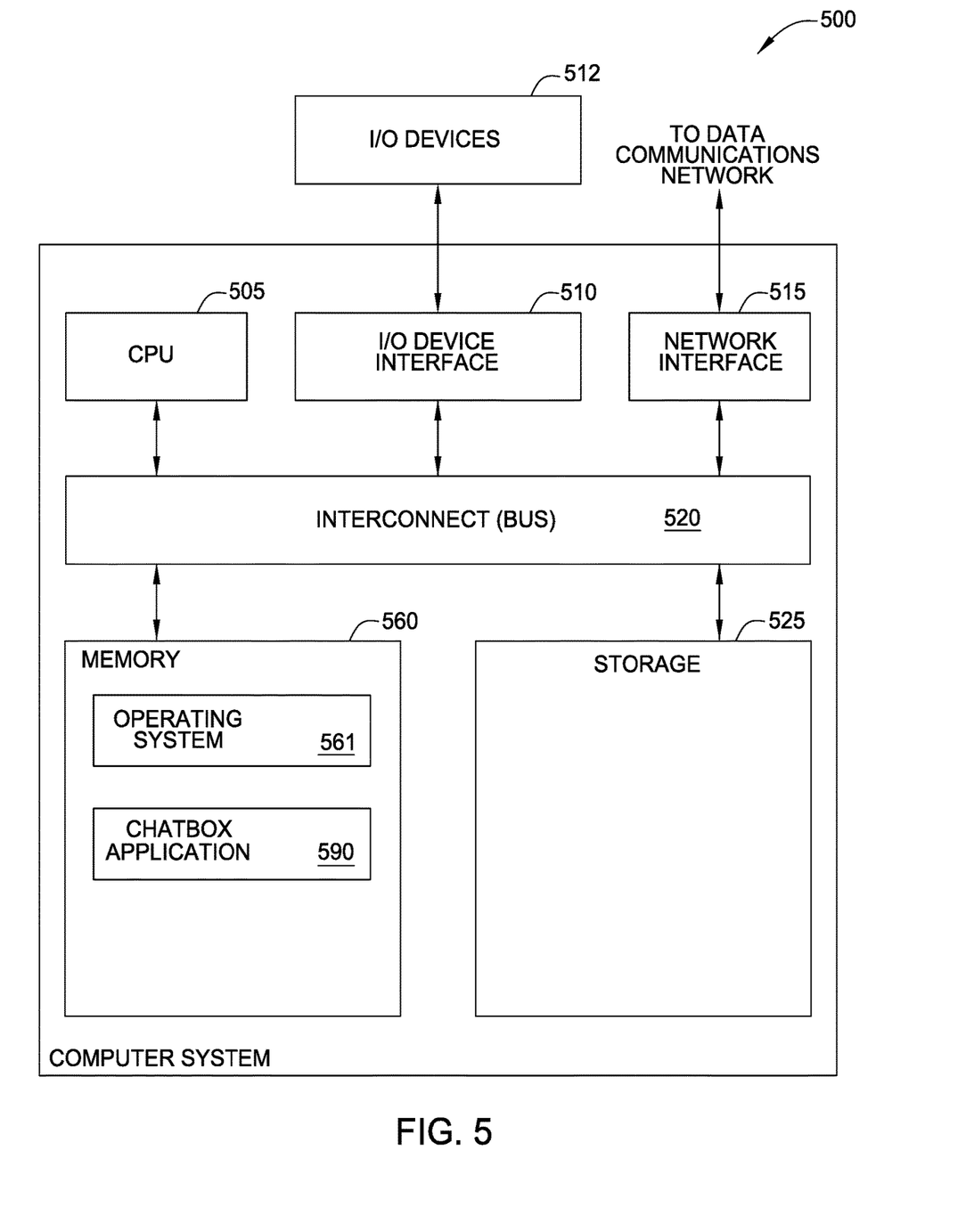
FIG. 5 illustrates a computing device, according to aspects of the present disclosure.

FIG. 5 illustrates a computing system 500 in which one or more of the administrative device 120 or monitored device 130 may be implemented. As shown, the computing system 500 includes, without limitation, a central processing unit (CPU) 505, a network interface 515, an interconnect 520, a memory 560, and storage 530. The computing system 500 may also include an I/O device interface 510 connecting I/O devices 512 (e.g., keyboard, display and mouse devices) to the computing system 500.

The CPU 505 retrieves and executes programming instructions stored in the memory 560. Similarly, the CPU 505 stores and retrieves application data residing in the memory 560. The interconnect 520 facilitates transmission, such as of programming instructions and application data, between the CPU 505, I/O device interface 510, storage 530, network interface 515, and memory 560. CPU 505 is included to be representative of a single CPU, multiple CPUs, a single CPU having multiple processing cores, and the like. And the memory 560 is generally included to be representative of a random access memory. The storage 530 may be a disk drive storage device. Although shown as a single unit, the storage 520 may be a combination of fixed and/or removable storage devices, such as magnetic disk drives, flash drives, removable memory cards or optical storage, network attached storage (NAS), or a storage area-network (SAN). Further, computing system 500 is included to be representative of a physical computing system as well as virtual machine instances hosted on a set of underlying physical computing systems. Further still, although shown as a single computing system, one of ordinary skill in the art will recognized that the components of the computing system 500 shown in FIG. 5 may be distributed across multiple computing systems connected by a data communications network.

As shown, the memory 560 includes an operating system 561 (e.g., Microsoft's Windows® Operating System) and a chatbot application 590 to provide a chatbot as described herein. Note, in the administrative device 110, the memory 560 would include the master chatbot 130 discussed above, which is configured to control the input to and output from one or more micro chatbots 140, and in the monitored device 120, the memory 560 would include the micro chatbot 140. In one embodiment, the chatbot application 590 may execute some or all of the federated chatbot system according to the method 200 discussed above with respect to FIG. 2.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method comprising:
processing a natural language query, by a first chatbot provided by an administrative device, to identify a monitored device in a computing environment that relates to the natural language query;
transmitting, from the administrative device, the query from the first chatbot to a second chatbot provided by the monitored device;
receiving, at the administrative device, a response from the second chatbot identifying an anomaly observed on the monitored device; and
outputting, by the administrative device, a natural language summary of the response for display in a user interface.

2. The method of claim 1, further comprising:
transmitting, from the administrative device, the query to a third chatbot provided by a second monitored device in the computing environment;
receiving, at the administrative device, a second response from the third chatbot identifying, in natural language, a second anomaly observed on the second monitored device; and
wherein the natural language summary includes the response and the second response.

3. The method of claim 2, further comprising:
prior to transmitting the query to the second chatbot, formatting the query into a first formatted query based on a class of the second chatbot;
prior to transmitting the query to the third chatbot, formatting the query into a second formatted query based on a class of the third chatbot different from the first formatted query;
wherein the query is transmitted to the second chatbot as the first formatted query; and
wherein the query is transmitted to the third chatbot as the second formatted query.

4. The method of claim 1, further comprising:
transmitting, from the administrative device, the query to a third chatbot provided by a second monitored device in the computing environment;
receiving, at the administrative device, a second response from the third chatbot identifying, in natural language, that no anomaly has been observed on the second monitored device; and
wherein the natural language summary includes the response and not the second response.

5. The method of claim 1, wherein identifying the monitored device includes:
identifying a problem stated in the query;
identifying a machine class associated with the problem;
identifying a chatbot class associated with the machine class and the problem; and wherein the second chatbot belongs to the chatbot class identified and the monitored device belongs to the machine class identified.

6. The method of claim 1, further comprising:
receiving, at the first chatbot, a subsequent query in natural language;
determining a chatbot to which the subsequent query is directed based on a chatbot identifier indicated in the subsequent query; and
transmitting the subsequent query to the determined chatbot.

7. The method of claim 1, wherein the summary indicates, in natural language, the anomaly received from the second chatbot relative to nominal values received from other chatbots, wherein responses from the other chatbots are not included in the user interface for display.

8. A system, comprising:
a processor; and
a memory device including instructions that when executed by the processor enable the processor to:
identify a plurality of chatbots that correspond to an identified problem stated in a natural language query, wherein the plurality of chatbots are provided on a plurality of devices in a computing environment;
transmitting a plurality of formatted queries to the plurality of chatbots, based on the natural language query; and
in response to receiving anomaly determinations from the plurality of chatbots, output for display, in a user interface, a natural language summary of those anomaly determinations of the anomaly determinations that positively indicate an anomaly on a corresponding device.

9. The system of claim 8, wherein the processor is further enabled to:
receive a subsequent natural language query indicating at least one identity of the chatbots outputted in the user interface.

10. The system of claim 9, wherein the at least one identity matches a master chatbot, the processor is further enabled to:
treat the subsequent natural language query as a new query addressed to one or more chatbots.

11. The system of claim 9, wherein the at least one identity matches at least one micro chatbot, the processor is further enabled to:
direct the subsequent query to at least one specified micro chatbot matching the at least one identity.

12. The system of claim 8, wherein values for a metric included in the anomaly determinations are aggregated to determine a nominal value for the metric, and wherein a given value included in a given anomaly determination is compared against the nominal value to determine whether an anomaly has occurred at a given monitored device from which the given anomaly determination is received.

13. The system of claim 8, wherein the anomaly determinations indicate that no anomalies were identified by the chatbots in response to the natural language query, the summary indicates that no anomalies were identified and no identities of the chatbots are output for display in association with the natural language summary.

14. A computer program product for controlling federated chatbots, the computer program product comprising:
a computer-readable storage medium having computer-readable program code embodied therewith, the computer-readable program code executable by one or more computer processors to:

receive, at a first chatbot running on an administrative device, a query in natural language related to a computing environment;

identify, by the first chatbot, a monitored device in the computing environment from the query;

transmit, from the administrative device, the query to a second chatbot provided by the monitored device;

receive, at the administrative device, a response from the second chatbot including a natural language anomaly observation related to an anomaly observed on the monitored device; and output a natural language summary of the response including an identity of the second chatbot for display in a user interface.

15. The computer program product of claim 14, wherein the computer-readable program code is further executable by one or more computer processors to:

transmit the query from the administrative device to a third chatbot provided by a second monitored device in the computing environment;

receive, at the administrative device, a second response from the third chatbot including a second natural language anomaly observation related to a second anomaly observed on the second monitored device; and wherein the natural language summary further includes the second response and a second identity of the third chatbot.

16. The computer program product of claim 15, wherein the computer-readable program code is further executable by one or more computer processors to:

prior to transmitting the query to the second chatbot, format the query into a first formatted query based on a class of the second chatbot;

prior to transmitting the query to the third chatbot, format the query into a second formatted query based on a class of the third chatbot different from the first formatted query;

wherein the query is transmitted to the second chatbot as the first formatted query; and wherein the query is transmitted to the third chatbot as the second formatted query.

17. The computer program product of claim 14, wherein the computer-readable program code is further executable by one or more computer processors to:

transmit the query from the administrative device to a third chatbot provided by a second monitored device in the computing environment;

receive, at the administrative device, a second response from the third chatbot including a second natural language anomaly observation related to no anomaly being observed on the second monitored device; and wherein the natural language summary includes the response and not the second response.

18. The computer program product of claim 14, wherein the computer-readable program code is further executable by one or more computer processors to identify the monitored device to:

identify a problem stated in the query;

identify a machine class associated with the problem;

identify a chatbot class associated with the machine class and the problem; and wherein the second chatbot belongs to the chatbot class identified and the monitored device belongs to the machine class identified.

19. The computer program product of claim 14, wherein the computer-readable program code is further executable by one or more computer processors to:

receive, at the first chatbot, a subsequent query in natural language;

determine a given chatbot identified in the user interface to which the subsequent query is directed; and transmit the subsequent query to the given chatbot.

20. The computer program product of claim 14, wherein the summary indicates, in natural language, the anomaly received from the second chatbot relative to nominal values received from other chatbots, wherein the other chatbots are not identified in the user interface and response from the other chatbots are not output for display in the user interface.

* * * * *